United States Patent
Matsuo

(10) Patent No.: US 9,508,975 B1
(45) Date of Patent: Nov. 29, 2016

(54) NONAQUEOUS ELECTROLYTE SECONDARY BATTERY SEPARATOR, NONAQUEOUS ELECTROLYTE SECONDARY BATTERY LAMINATED SEPARATOR, NONAQUEOUS ELECTROLYTE SECONDARY BATTERY MEMBER, AND NONAQUEOUS ELECTROLYTE SECONDARY BATTERY

(71) Applicant: Sumitomo Chemical Company, Limited, Tokyo (JP)

(72) Inventor: Takahiro Matsuo, Niihama (JP)

(73) Assignee: Sumitomo Chemical Company, Limited, Tokyo (JP)

(*) Notice: Subject to any disclaimer, the term of this patent is extended or adjusted under 35 U.S.C. 154(b) by 0 days.

(21) Appl. No.: 15/191,751

(22) Filed: Jun. 24, 2016

(30) Foreign Application Priority Data

Nov. 30, 2015 (JP) .................................. 2015-233929

(51) Int. Cl.
*H01M 2/16* (2006.01)
*H01M 4/131* (2010.01)
(Continued)

(52) U.S. Cl.
CPC ......... *H01M 2/1653* (2013.01); *H01M 2/1686* (2013.01); *H01M 4/131* (2013.01); *H01M 4/133* (2013.01); *H01M 4/505* (2013.01); *H01M 4/525* (2013.01); *H01M 4/587* (2013.01); *H01M 4/622* (2013.01); *H01M 4/623* (2013.01); *H01M 4/661* (2013.01); *H01M 10/0525* (2013.01); *H01M 10/0568* (2013.01); *H01M 10/0569* (2013.01); *H01M 10/0585* (2013.01); *H01M 2/145* (2013.01); *H01M 4/0404* (2013.01); *H01M 4/1391* (2013.01); *H01M 4/1393* (2013.01);
(Continued)

(58) Field of Classification Search
CPC .......... H01M 2/1653; H01M 2/1686; H01M 4/131; H01M 4/133; H01M 4/505; H01M 4/525; H01M 4/587; H01M 4/622; H01M 4/623; H01M 4/661; H01M 10/0525; H01M 10/0568; H01M 10/0569; H01M 10/0585; H01M 2/14; H01M 2/16; H01M 2/18
USPC ....................................................... 429/144
See application file for complete search history.

(56) References Cited

U.S. PATENT DOCUMENTS

2013/0209892 A1    8/2013    Ogawa et al.
2013/0337311 A1   12/2013    Itou

FOREIGN PATENT DOCUMENTS

EP          2607414 A1    6/2013
EP          2660277 A1   11/2013
(Continued)

OTHER PUBLICATIONS

Yasushi et al. JP 2007-238822. Sep. 20, 2007. English machine translation by JPO.*
(Continued)

*Primary Examiner* — James Lee
(74) *Attorney, Agent, or Firm* — Panitch Schwarze Belisario & Nadel LLP

(57) ABSTRACT

A nonaqueous electrolyte secondary battery separator is a porous film containing a polyolefin as a main component. The nonaqueous electrolyte secondary battery separator (i) has a phase difference of 80 nm or less with respect to light having a wavelength of 590 nm in a state where the nonaqueous electrolyte secondary battery separator is impregnated with ethanol and (ii) has a porosity of 30% to 60%.

6 Claims, 1 Drawing Sheet

(51) Int. Cl.

| | |
|---|---|
| *H01M 4/505* | (2010.01) |
| *H01M 4/525* | (2010.01) |
| *H01M 4/62* | (2006.01) |
| *H01M 4/66* | (2006.01) |
| *H01M 4/133* | (2010.01) |
| *H01M 4/587* | (2010.01) |
| *H01M 10/0525* | (2010.01) |
| *H01M 10/0585* | (2010.01) |
| *H01M 10/0568* | (2010.01) |
| *H01M 10/0569* | (2010.01) |
| *H01M 2/14* | (2006.01) |
| *H01M 4/02* | (2006.01) |
| *H01M 4/1391* | (2010.01) |
| *H01M 4/04* | (2006.01) |
| *H01M 4/1393* | (2010.01) |

(52) U.S. Cl.
CPC .  *H01M 2004/021* (2013.01); *H01M 2004/027* (2013.01); *H01M 2004/028* (2013.01); *H01M 2300/004* (2013.01)

(56) References Cited

FOREIGN PATENT DOCUMENTS

| | | |
|---|---|---|
| JP | H 07188440 A | 7/1995 |
| JP | 2007238822 A | 9/2007 |
| JP | 2011246659 A | 12/2011 |
| JP | 2012082286 A | 4/2012 |
| JP | 2012092287 A | 5/2012 |
| JP | 2012092288 A | 5/2012 |
| JP | 5164296 B2 | 3/2013 |
| JP | 5167435 B2 | 3/2013 |
| JP | 2013194153 A | 9/2013 |
| JP | 2015026609 A | 2/2015 |
| JP | 5743032 B1 | 7/2015 |
| JP | 2015140439 A | 8/2015 |
| WO | 2012090632 A1 | 7/2012 |

OTHER PUBLICATIONS

Decision to Grant a Patent issued Mar. 7, 2016 in JP Application No. 2015-233929.

* cited by examiner

NONAQUEOUS ELECTROLYTE SECONDARY BATTERY SEPARATOR, NONAQUEOUS ELECTROLYTE SECONDARY BATTERY LAMINATED SEPARATOR, NONAQUEOUS ELECTROLYTE SECONDARY BATTERY MEMBER, AND NONAQUEOUS ELECTROLYTE SECONDARY BATTERY

This Nonprovisional application claims priority under 35 U.S.C. §119 on Patent Application No. 2015-233929 filed in Japan on Nov. 30, 2015, the entire contents of which are hereby incorporated by reference.

TECHNICAL FIELD

The present invention relates to a nonaqueous electrolyte secondary battery separator, a nonaqueous electrolyte secondary battery laminated separator, a nonaqueous electrolyte secondary battery member, and a nonaqueous electrolyte secondary battery.

BACKGROUND ART

Nonaqueous electrolyte secondary batteries such as a lithium ion secondary battery have a high energy density, and are thus in wide use as batteries for devices such as a personal computer, a mobile telephone, and a portable information terminal. Such nonaqueous electrolyte secondary batteries have recently been developed as an on-vehicle battery.

A microporous film that contains a polyolefin as a main component is used as a separator in a nonaqueous electrolyte secondary battery such as a lithium ion secondary battery (Patent Literature 1). Use of such a separator makes it possible to provide a nonaqueous electrolyte secondary battery having both of good safety and a cycle characteristic.

CITATION LIST

Patent Literature

[Patent Literature 1]
Japanese Patent No. 5164296 (Publication Date: Mar. 21, 2013)

SUMMARY OF INVENTION

Technical Problem

However, use of a conventional separator causes a problem that a nonaqueous electrolyte secondary battery which is immediately after being assembled has a high internal resistance.

The present invention is accomplished in view of the problem, and an object of the present invention is to provide (i) a nonaqueous electrolyte secondary battery which has an excellent (low) internal resistance immediately after being assembled and (ii) a nonaqueous electrolyte secondary battery separator, a nonaqueous electrolyte secondary battery laminated separator, and a nonaqueous electrolyte secondary battery member each of which is used to obtain such a nonaqueous electrolyte secondary battery having an excellent internal resistance immediately after being assembled.

Solution to Problem

The inventors of the present invention have completed the present invention by finding for the first time that, in a case where a nonaqueous electrolyte secondary battery separator which is not an optical component is used in a nonaqueous electrolyte secondary battery, an internal resistance of the nonaqueous electrolyte secondary battery which is immediately after being assembled becomes lower as a phase difference of the nonaqueous electrolyte secondary battery separator is smaller with respect to light having a wavelength of 590 nm.

A nonaqueous secondary battery separator in accordance with the present invention is a nonaqueous electrolyte secondary battery separator which is a porous film containing a polyolefin as a main component, the nonaqueous electrolyte secondary battery separator (i) having a phase difference of 80 nm or less with respect to light having a wavelength of 590 nm in a state where the nonaqueous electrolyte secondary battery separator is impregnated with ethanol and (ii) having a porosity of 30% to 60%.

The nonaqueous electrolyte secondary battery laminated separator in accordance with the present invention includes: the nonaqueous electrolyte secondary battery separator; and a porous layer.

The nonaqueous electrolyte secondary battery member in accordance with the present invention includes: a cathode; the nonaqueous electrolyte secondary battery separator or the nonaqueous electrolyte secondary battery laminated separator; and an anode, the cathode, the nonaqueous electrolyte secondary battery separator or the nonaqueous electrolyte secondary battery laminated separator, and the anode being arranged in this order.

The nonaqueous electrolyte secondary battery in accordance with the present invention includes the nonaqueous electrolyte secondary battery separator or the nonaqueous electrolyte secondary battery laminated separator.

Advantageous Effects of Invention

The present invention brings about an effect of achieving an excellent internal resistance of a nonaqueous electrolyte secondary battery which is immediately after being assembled.

DESCRIPTION OF EMBODIMENTS

Figure 1:
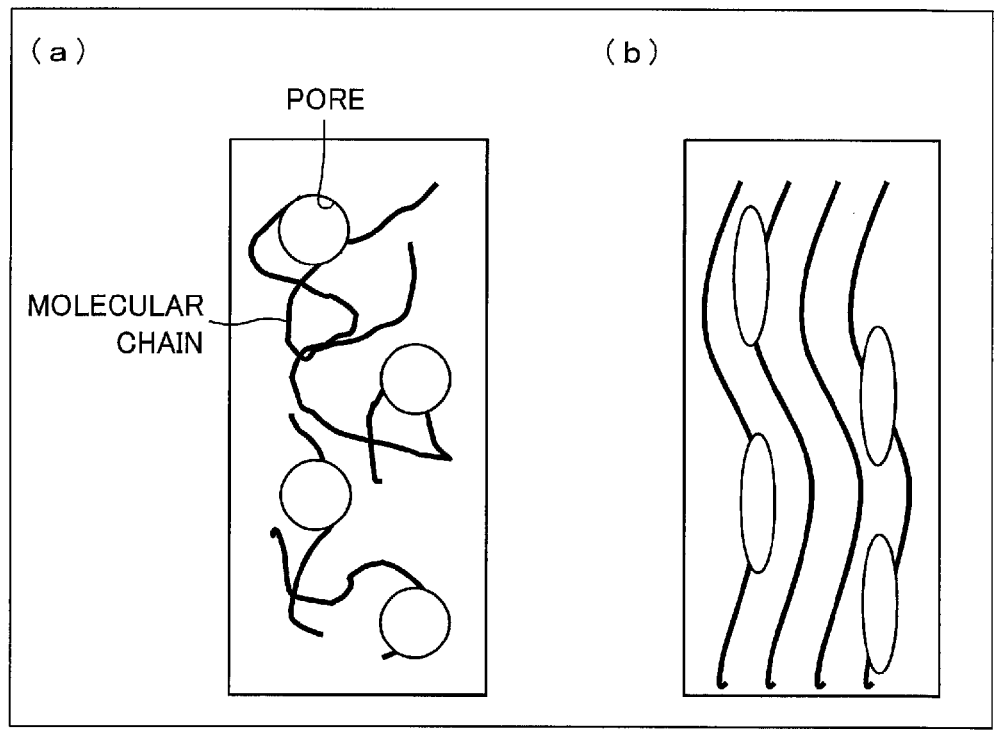
FIG. 1 is a view illustrating a relationship between (i) a molecular chain and a pore in a resin constituting a porous film and (ii) a phase difference.

The description below will discuss an embodiment of the present invention. The present invention is, however, not limited to such an embodiment. That is, the present invention is not limited to configurations described below, but can be altered by a skilled person in the art within the scope of the claims. And embodiment derived from a proper combination of technical means each disclosed in a different embodiment is also encompassed in the technical scope of the present invention. In the present specification, any numerical range expressed as "A to B" means not less than A and not greater than B' unless otherwise stated.

[1. Separator]

(1-1) Nonaqueous Electrolyte Secondary Battery Separator

A nonaqueous electrolyte secondary battery separator in accordance with an embodiment of the present invention is a porous film that is filmy and is provided between a cathode and an anode in a nonaqueous electrolyte secondary battery.

The porous film only needs to be made of a porous and filmy base material containing a polyolefin-based resin as a main component (i.e., made of a polyolefin-based porous base material). That is, the porous film is a film that (i) has therein pores connected to one another and (ii) allows a gas or a liquid to pass therethrough from one surface to the other surface.

The porous film can be arranged such that, in a case where the nonaqueous electrolyte secondary battery generates heat, the porous film is melted so as to make a non-aqueous secondary battery separator non-porous. Thus, the porous film can impart to the non-aqueous secondary battery separator a shutdown function. The porous film can be made of a single layer or a plurality of layers.

A thickness of the porous film can be determined as appropriate in consideration of a thickness of a nonaqueous electrolyte secondary battery member constituting the non-aqueous electrolyte secondary battery. The porous film has preferably a thickness of 4 μm to 40 μm, more preferably a thickness of 5 μm to 30 μm, and further preferably a thickness of 6 μm to 15 μm.

The porous film has a volume-based porosity of 30% to 60%, and preferably 40% to 60%, in order to allow the non-aqueous secondary battery separator to (i) retain a larger amount of electrolyte solution and (ii) achieve a function of reliably preventing (shutting down) a flow of an excessively large current at a lower temperature. The porous film has pores having an average diameter (an average pore diameter) of preferably 0.3 μm or less, more preferably 0.14 μm or less, in order to, in a case where the porous film is used as a separator, achieve sufficient ion permeability and prevent particles from entering the cathode or the anode.

The porous film has a phase difference of 50 nm or less with respect to light having a wavelength of 590 nm in a state where the porous film is impregnated with ethanol. The phase difference of the porous film is preferably not less than 5 nm and not greater than 80 nm, more preferably not less than 20 nm and not greater than 80 nm. Note that the porous film has a birefringent index of preferably 0.004 or less, more preferably not less than 0.001 and not greater than 0.004, and further preferably not less than 0.002 and not greater than 0.004.

In a case where refractive indices of light are different between an x axis direction and a y axis direction of a surface of the porous film which x axis direction and y axis direction are orthogonal to each other, namely the porous film has birefringence, the birefringence causes a phase difference between the x axis direction and the y axis direction, with respect to light that (i) has entered from a normal direction of the surface of the porous film and (ii) has passed through the porous film. Such a phase difference is a physical property which is the focus of attention in a case where the porous film is used as an optical component. However, the inventors of the present invention found for the first time that, as a phase difference is smaller in a nonaqueous electrolyte secondary battery separator which is not an optical component, a nonaqueous electrolyte secondary battery which is immediately after being assembled and includes such a nonaqueous electrolyte secondary battery separator has a lower internal resistance. As such, the inventors of the present invention have completed the present invention based on this finding.

That is, as described above, the inventors of the present invention have focused on a fact that, in a case where (i) a porous film has a volume-based porosity of 30% to 60% in order to retain a larger amount of electrolyte solution, (ii) a nonaqueous electrolyte secondary battery in which the porous film is used as a nonaqueous electrolyte secondary battery separator is assembled, and (iii) an electrolyte solution is injected into the nonaqueous electrolyte secondary battery, an internal resistance of the nonaqueous electrolyte secondary battery varies depending on a speed at which the electrolyte solution permeates through the nonaqueous electrolyte secondary battery separator. Then, as described above, the inventors of the present invention have found that, in a case where a phase difference of the porous film with respect to light having a wavelength of 590 nm is controlled to be 80 nm or less, the electrolyte solution permeates through the nonaqueous electrolyte secondary battery separator at a higher speed when the nonaqueous electrolyte secondary battery is assembled, and this allows the nonaqueous electrolyte secondary battery to have a lower internal resistance.

A phase difference of a porous film depends on a structure of a molecular chain and a pore in a resin constituting the porous film. FIG. 1 is a view schematically illustrating a relationship between a phase difference and a structure of a porous film. (a) of FIG. 1 illustrates a structure of a porous film whose phase difference is relatively small. (b) of FIG. 1 illustrates a structure of a porous film whose phase difference is relatively large. As illustrated in (a) of FIG. 1, in the porous film having a small phase difference, molecular chains and pores in a resin constituting the porous film are irregularly arranged and there is almost no anisotropy. Meanwhile, as illustrated in (b) of FIG. 1 in the porous film having a large phase difference, molecular chains are orientated in a specific direction and pores have shapes extending in an identical direction.

In a case where the nonaqueous electrolyte secondary battery is assembled, the nonaqueous electrolyte secondary battery separator is immersed in an electrolyte solution in a state where the nonaqueous electrolyte secondary battery separator is sandwiched between a cathode sheet and an anode sheet. This causes the nonaqueous electrolyte secondary battery separator to absorb the electrolyte solution from an end surface of the nonaqueous electrolyte secondary battery separator. In doing so, in a case of the porous film illustrated in (b) of FIG. 1, the electrolyte solution is more likely to be absorbed in an orientation direction of the molecular chains, whereas the electrolyte solution is less likely to be absorbed in a direction perpendicular to the orientation direction of the molecular chains. Therefore, the electrolyte solution is mainly absorbed from an end surface of the nonaqueous electrolyte secondary battery separator which end surface is perpendicular to the orientation direction of the molecular chains, and the electrolyte solution thus absorbed permeates, in the orientation direction, through the nonaqueous electrolyte secondary battery separator. As a result, it takes time until the electrolyte solution permeates through the entire nonaqueous electrolyte secondary battery separator.

Meanwhile, in a case of the porous film illustrated in (a) of FIG. 1, since the pores are irregularly arranged, the electrolyte solution can be absorbed by any of end surfaces. This allows the electrolyte solution to permeate through the entire nonaqueous electrolyte secondary battery separator in a short time.

Therefore, as a phase difference of a porous film is smaller, it is possible for a nonaqueous electrolyte secondary battery in which the porous film is used as a nonaqueous electrolyte secondary battery separator to have a lower internal resistance immediately after the nonaqueous electrolyte secondary battery has been assembled.

It is essential that the porous film contains a polyolefin component at a proportion of 50% by volume or more with respect to whole components contained in the porous film. Such a proportion of the polyolefin component is preferably 90% by volume or more, and more preferably 95% by volume or more. The porous film preferably contains, as the polyolefin component, a high molecular weight component having a weight-average molecular weight of $5 \times 10^5$ to $15 \times 10^6$. The porous film particularly preferably contains, as the polyolefin component, a polyolefin component having a weight-average molecular weight of 1,000,000 or more. This is because that (i) a porous film containing such a polyolefin component and (ii) the whole of a nonaqueous electrolyte secondary battery separator including such a porous film achieve higher strength.

Examples of the polyolefin-based resin constituting the porous film include high molecular weight homopolymers or copolymers produced through polymerization of ethylene, propylene, 1-butene, 4-methyl-1-pentene, 1-hexene, and/or the like. The porous film can be a layer containing only one of these polyolefin-based resins and/or a layer containing two or more of these polyolefin-based resins. Among these, a high molecular weight polyethylene containing ethylene as a main component is particularly preferable. Note that the porous film can contain another component which is not a polyolefin, as long as the another component does not impair the function of the layer.

The porous film has normally an air permeability of in a range from 30 sec/100 cc to 500 sec/100 cc, and preferably in a range from 50 sec/100 cc to 300 sec/100 cc, in terms of Gurley values. A porous film having such an air permeability achieves sufficient ion permeability in a case where the porous film is used as a separator.

The porous film has normally a weight per unit area of 4 g/m$^2$ to 20 g/m$^2$, and preferably 4 g/m$^2$ to 12 g/m$^2$, because such a weight per unit area of the porous film can increase (i) a strength, a thickness, handling easiness, and a weight of the porous film and (ii) a weight energy density and a volume energy density of a nonaqueous electrolyte secondary battery including the porous film as a nonaqueous electrolyte secondary battery separator.

The following description will discuss a method of producing a porous film.

First, a resin composition which serves as a raw material of the porous film is produced. For example, a polyolefin resin composition is obtained by kneading (i) an ultra high molecular weight polyethylene, (ii) a low molecular weight polyethylene having a weight-average molecular weight of 10,000 or less, (iii) a pore forming agent such as calcium carbonate or a plasticizing agent, and (iv) an antioxidant.

Subsequently, the polyolefin resin composition is pressed and stretched by a pair of reduction rolls, and is then gradually cooled while being pulled by a winding roll which rotates at a speed different from that of the pair of reduction rolls, so that the polyolefin resin composition is shaped into a sheet. A pore forming agent is then removed from the sheet thus obtained, and the sheet is drawn at a predetermined stretch ratio.

Note that, it is possible to control a phase difference of the porous film by appropriately changing (i) a roll-draw ratio (a winding roll speed/a reduction roll speed) which is a ratio between a rotation speed of a winding roll and a rotation speed of reduction rolls and (ii) the stretch ratio.

(1-2) Nonaqueous Electrolyte Secondary Battery Laminated Separator

The nonaqueous electrolyte secondary battery separator of the present invention can include a publicly known porous layer such as an adhesive layer, a heat-resistant layer, and/or a protective layer. In the present specification, a separator including (i) a nonaqueous electrolyte secondary battery separator and (ii) a porous layer is referred to as "nonaqueous electrolyte secondary battery laminated separator" (hereinafter, sometimes referred to as "laminated separator").

The separator is preferably subjected to a hydrophilization treatment before a porous layer is formed thereon, that is, before a coating solution described below is applied thereto. Performing a hydrophilization treatment on the separator further improves coating easiness of the coating solution and thus allows a more uniform porous layer to be formed. This hydrophilization treatment is effective in a case where a solvent (disperse medium) contained in the coating solution has a high proportion of water.

Specific examples of the hydrophilization treatment include publicly known treatments such as (i) a chemical treatment involving an acid, an alkali, or the like, (ii) a corona treatment, and (iii) a plasma treatment. Among these hydrophilization treatments, a corona treatment is preferable because it can not only hydrophilize the separator within a relatively short time period, but also hydrophilize only a surface and its vicinity of the separator to leave the inside of the separator unchanged in quality.

(Porous Layer)

The porous layer is preferably a resin layer containing a resin. The resin constituting the porous layer is preferably (i) insoluble in the electrolyte solution of the nonaqueous electrolyte secondary battery and (ii) electrochemically stable when the nonaqueous electrolyte secondary battery is in normal use. In a case where the porous layer is laminated on one surface of a separator which is used as a member of the nonaqueous electrolyte secondary battery, the porous layer is preferably laminated on a surface of the separator which surface faces a cathode of the nonaqueous electrolyte secondary battery, more preferably laminated on a surface of the separator which surface comes into contact with the cathode.

Examples of the resin constituting the porous layer include polyolefins such as polyethylene, polypropylene, polybutene, and ethylene-propylene copolymer; fluorine-containing resins such as polyvinylidene fluoride (PVDF) and polytetrafluoroethylene; fluorine-containing rubbers such as vinylidene fluoride-hexafluoropropylene-tetrafluoroethylene copolymer and ethylene-tetrafluoroethylene copolymer; aromatic polyamides; fully aromatic polyamides (aramid resins); rubbers such as styrene-butadiene copolymer and hydrogenated one thereof, methacrylic acid ester copolymer, acrylonitrile-acrylic acid ester copolymer, styrene-acrylic acid ester copolymer, ethylene propylene rubber, and polyvinyl acetate; resins with a melting point or glass transition temperature of 180° C. or higher such as polyphenylene ether, polysulfone, polyether sulfone, polyphenylene sulfide, polyetherimide, polyamide imide, polyetheramide, and polyester; and water-soluble polymers such as polyvinyl alcohol, polyethyleneglycol, cellulose ether, sodium alginate, polyacrylic acid, polyacrylamide, and polymethacrylic acid.

Specific examples of the aromatic polyamides include poly(paraphenylene terephthalamide), poly(methaphenylene isophthalamide), poly(parabenzamide), poly(methabenzamide), poly(4,4'-benzanilide terephthalamide), poly(paraphenylene-4,4'-biphenylene dicarboxylic acid amide), poly(methaphenylene-4,4'-biphenylene dicarboxylic acid amide), poly(paraphenylene-2,6-naphthalene dicarboxylic acid amide), poly(methaphenylene-2,6-naphthalene dicarboxylic acid amide), poly(2-chloroparaphenylene terephthalamide), paraphenylene terephthalamide/2,6-dichloroparaphenylene terephthalamide copolymer, and methaphenylene terephthalamide/2,6-dichloroparaphenylene terephthalamide copolymer. Among these, poly(paraphenylene terephthalamide) is preferable.

Among the above resins, a polyolefin, a fluorine-containing resin, an aromatic polyamide, and a water-soluble polymer are more preferable. Among these resins, a fluorine-containing resin is particularly preferable in a case where the porous layer is provided so as to face the cathode of the nonaqueous electrolyte secondary battery. Use of a fluorine-containing resin makes it easy to maintain various performance capabilities such as a rate characteristic and a resistance characteristic (solution resistance) of the nonaqueous electrolyte secondary battery even in a case where a deterioration in acidity occurs while the nonaqueous electrolyte secondary battery is being operated. A water-soluble polymer, which allows water to be used as a solvent to form the porous layer, is more preferable in terms of a process or an environmental load, cellulose ether and sodium alginate are further preferable, and cellulose ether is particularly preferable.

Specific examples of the cellulose ether include carboxymethyl cellulose (CMC), hydroxyethyl cellulose (HEC), carboxy ethyl cellulose, methyl cellulose, ethyl cellulose, cyan ethyl cellulose, and oxyethyl cellulose. Among these, CMC and HEC, which less deteriorate after being used for a long time and have excellent chemical stability, are more preferable, and CMC is particularly preferable.

The porous layer more preferably contains a filler. In a case where the porous layer contains a filler, the resin functions as a binder resin. The filler is not particularly limited to a specific one and can be a filler made of organic matter or a filler made of inorganic matter.

Specific examples of the filler made of organic matter include fillers made of (i) a homopolymer of a monomer such as styrene, vinyl ketone, acrylonitrile, methyl methacrylate, ethyl methacrylate, glycidyl methacrylate, glycidyl acrylate, or methyl acrylate, or (ii) a copolymer of two or more of such monomers; fluorine-containing resins such as polytetrafluoroethylene, a tetrafluoroethylene-hexafluoropropylene copolymer, a tetrafluoroethylene-ethylene copolymer, and polyvinylidene fluoride; melamine resin; urea resin; polyethylene; polypropylene; and polyacrylic acid and polymethacrylic acid.

Specific examples of the filler made of inorganic matter include fillers made of calcium carbonate, talc, clay, kaolin, silica, hydrotalcite, diatomaceous earth, magnesium carbonate, barium carbonate, calcium sulfate, magnesium sulfate, barium sulfate, aluminum hydroxide, boehmite, magnesium hydroxide, calcium oxide, magnesium oxide, titanium oxide, titanium nitride, alumina (aluminum oxide), aluminum nitride, mica, zeolite, or glass. The porous layer may contain (i) only one kind of filler or (ii) two or more kinds of fillers in combination.

Among the above fillers, a filler made of inorganic matter is suitable. A filler made of an inorganic oxide such as silica, calcium oxide, magnesium oxide, titanium oxide, alumina, mica, zeolite, aluminum hydroxide, or boehmite is more preferable. A filler made of at least one kind selected from the group consisting of silica, magnesium oxide, titanium oxide, aluminum hydroxide, boehmite, and alumina is further preferable. A filler made of alumina is particularly preferable. While alumina has many crystal forms such as $\alpha$-alumina, $\beta$-alumina, $\gamma$-alumina, and $\theta$-alumina, any of the crystal forms can be used suitably. Among the above crystal forms, $\alpha$-alumina is the most preferable because it is particularly high in thermal stability and chemical stability.

The filler has a shape that varies depending on, for example, (i) the method of producing the organic matter or inorganic matter as a raw material and (ii) the condition under which the filler is dispersed when the coating solution for forming a porous layer is prepared. The filler may have any shape such as a spherical shape, an oblong shape, a rectangular shape, a gourd shape, or an indefinite, irregular shape.

In a case where the porous layer contains a filler, the filler is contained in an amount of preferably 1% by volume to 99% by volume, and more preferably 5% by volume to 95% by volume, with respect to the porous layer. The porous layer containing the filler in an amount falling within the above range makes it less likely for a void, which is formed when fillers make contact with each other, to be blocked by a resin or the like. This makes it possible to achieve sufficient ion permeability and an appropriate weight per unit area of the porous film.

According to the present invention, a coating solution for forming a porous layer is normally prepared by dissolving the resin in a solvent and further dispersing the above filler in the solvent.

The solvent (disperse medium) may be any solvent that does not adversely influence the porous film, that allows the resin to be dissolved uniformly and stably, and that allows the filler to be dispersed uniformly and stably. Specific examples of the solvent (disperse medium) include water; lower alcohols such as methyl alcohol, ethyl alcohol, n-propyl alcohol, isopropyl alcohol, and t-butyl alcohol; acetone, toluene, xylene, hexane, N-methylpyrrolidone, N,N-dimethylacetamide, and N,N-dimethylformamide. The present embodiment may use only one kind of solvent (disperse medium) or two or more kinds of solvents in combination.

The coating solution may be formed by any method, provided that the solution conditions (Such as a resin solid content (resin concentration) and an amount of fillers) which are necessary for obtaining a desired porous layer. Specific examples of a method of forming the coating solution include a mechanical stirring method, an ultrasonic dispersion method, a high-pressure dispersion method, and a media dispersion method.

It is also possible to disperse a filler in the solvent (disperse medium) by use of, for example, a conventionally publicly known dispersing device such as a three-one motor, a homogenizer, a media-type dispersing device, or a pressure-type dispersing device.

The coating solution can contain, as a component other than the resin and the filler, an additive such as a dispersing agent, a plasticizing agent, a surfactant, or a pH adjusting agent, provided that such an additive does not impair the object of the present invention. Note that the additive can be added in an amount that does not impair the object of the present invention.

There is no particular limit to how the coating solution is applied to the separator, that is, how a porous layer is formed on a surface of a separator that has been subjected to hydrophilization treatment as necessary. In a case where a porous layer is deposited on each of both surfaces of the separator, (i) a sequential deposition method may be used, which forms a porous layer on one surface of the separator and then forms another porous layer on the other surface, or (ii) a simultaneous deposition method may be used, which forms two porous layers simultaneously on respective surfaces of the separator.

Examples of a method of forming a porous layer include: a method in which the coating solution is directly applied to a surface of the separator and then a solvent (disperse medium) is removed; a method in which a porous layer is formed by applying the coating solution to an appropriate support and removing the solvent (disperse medium), and then the porous layer thus formed is pressure-bonded to the separator, and subsequently the support is peeled off; a method in which the coating solution is applied to an appropriate support and the porous film is pressure-bonded to an application surface, and subsequently the support is peeled off and then the solvent (disperse medium) is removed; and a method in which the separator is immersed in the coating solution so as to carry out dip coating, and then the solvent (disperse medium) is removed.

The thickness of the porous layer may be controlled by adjusting, for example, (i) the thickness of a coating film in a wet state after the coating, (ii) the weight ratio of the resin and the filler, and/or (iii) the solid content concentration of the coating solution (that is, the sum of the resin concentration and the filler concentration). Note that, for example, the support can be a film made of resin, a belt made of metal, a drum, or the like, The coating solution is applied to the separator or the support through any method that allows the coating solution to be applied in a necessary weight per unit area with a necessary coating area. The coating solution may be applied through a conventionally publicly known method. Specific examples of the method include gravure coater method, small-diameter gravure coater method, reverse roll coater method, transfer roll coater method, kiss coater method, dip coater method, knife coater method, air doctor blade coater method, blade coater method, rod coater method, squeeze coater method, cast coater method, bar coater method, die coater method, screen printing method, and spray applying method.

The solvent (disperse medium) is typically removed by a drying method. Examples of the drying method include natural drying, air-blow drying, heat drying, and vacuum drying. Note, however, that any drying method can be used, provided that the solvent (disperse medium) can be sufficiently removed by such a drying method. The above drying can be carried out by use of a normal drying device.

The drying can be carried out after substituting the solvent (disperse medium) contained in the coating solution with another solvent. Examples of a method of substituting the solvent (disperse medium) with another solvent and then removing the another solvent include a method in which (i) another solvent (hereinafter, referred to as "solvent X") is dissolved in the solvent (disperse medium) contained in the coating solution and does not dissolve a resin contained in the coating solution, (ii) the separator or the support on which a coating film has been formed by applying the coating solution is immersed in the solvent X, (iii) the solvent (disperse medium) contained in the coating film on the separator or the support is substituted with the solvent X, and then (iv) the solvent X is evaporated. Such a method makes it possible to efficiently remove the solvent (disperse medium) from the coating solution.

In a case where heating is carried out in order to remove the solvent (disperse medium) or the solvent X from the coating film of the coating solution which coating film has been formed on the separator or the support, it is desirable to carry out the heating at a temperature at which the air permeability of the separator is not decreased, specifically 10° C. to 120° C. and more preferably 20° C. to 80° C., in order to prevent the air permeability of the porous film from decreasing due to contraction of the pores of the porous film.

In a case where a laminated separator is formed by using a separator as a base material and laminating a porous layer on one surface or both surfaces of the separator, the thickness of the porous layer formed by the above method is preferably 0.5 μm to 15 μm (per one surface of the separator), and more preferably 2 μm to 10 μm (per one surface of the separation).

In a case where (i) a total film thickness which is a sum of a thickness of the porous layer on one side of the separator and a thickness of the porous layer on the other side of the separator is less than 1 μm and (ii) the laminated separator is used in a nonaqueous electrolyte secondary battery, it is impossible to sufficiently prevent an internal short circuit caused by, for example, a breakage of the nonaqueous electrolyte secondary battery. Moreover, such a case causes a decrease in amount of electrolyte solution retained by the porous layer.

Meanwhile, in a case where (i) a total film thickness which is a sum of a thickness of the porous layer on one side of the separator and a thickness of the porous layer on the other side of the separator is more than 30 μm and (ii) the laminated separator is used in the nonaqueous electrolyte secondary battery, a resistance against permeation of lithium ions increases in an entire area of the separator. In a case where a cycle is repeated, therefore, the cathode of the nonaqueous electrolyte secondary battery deteriorates, and this causes a deterioration in rate characteristic and/or cycle characteristic. Further, a distance between the cathode and the anode increases, and this causes the nonaqueous electrolyte secondary battery to be larger in size.

In the descriptions below regarding physical properties of the porous layer, in a case where the porous layer is laminated on each of both surfaces of the separator, such physical properties at least refer to those of a porous layer which is laminated on a surface of the separator which surface faces the cathode in the nonaqueous electrolyte secondary battery.

The porous layer only needs to have a weight per unit area (per one surface of the separator) which is determined as appropriate in view of strength, thickness, weight, and handling easiness of the laminated separator. The weight per unit area of the porous layer is normally preferably 1 $g/m^2$ to 20 $g/m^2$, and more preferably 2 $g/m^2$ to 10 $g/m^2$ in a case where the laminated separator is used in a nonaqueous electrolyte secondary battery.

In a case where the porous layer has a weight per unit area which falls within such numerical range, it is possible to increase the weight energy density and volume energy density of a nonaqueous electrolyte secondary battery including the porous layer. In a case where the weight per unit area of the porous layer exceeds the above numerical range, a nonaqueous electrolyte secondary battery including the laminated separator will be heavy.

The porous layer has a porosity of preferably 20% by volume to 90% by volume, and more preferably 30% by volume to 80% by volume, in order to achieve sufficient ion permeability. The pore diameter of pores in the porous layer preferably not more than 1 μm, and more preferably not more than 0.5 μm. In a case where the pores have such a pore diameter, a nonaqueous electrolyte secondary battery including a laminated separator including the porous layer can achieve sufficient ion permeability.

The laminated separator has preferably an air permeability of 30 sec/100 mL to 1000 sec/100 mL, and more preferably an air permeability of 50 sec/100 mL to 800 sec/100 mL, in terms of Gurley values. A laminated separator having such an air permeability achieves sufficient ion permeability in a case where the laminated separator is used as a member of the nonaqueous electrolyte secondary battery.

An air permeability larger than the above range means that the laminated separator has a high porosity and thus has a coarse laminated structure. This may result in the laminated separator having decreased strength, in particular insufficient shape stability at high temperatures. An air permeability smaller than the above range, on the other hand, may prevent the laminated separator from having sufficient ion permeability when used as a member of the nonaqueous electrolyte secondary battery and thus degrade the battery characteristics of the nonaqueous electrolyte secondary battery.

[2. Nonaqueous Electrolyte Secondary Battery]

The nonaqueous electrolyte secondary battery of the present invention includes the separator or the laminated separator (hereinafter the separator and the laminated separator are sometimes collectively referred to as "separator or the like"). More specifically, the nonaqueous electrolyte secondary battery of the present invention includes a nonaqueous electrolyte secondary battery member including a cathode, a separator or the like, and an anode that are arranged in this order. That is, the nonaqueous electrolyte secondary battery member is also encompassed in the scope of the present invention. The description below deals with a lithium ion secondary battery as an example of the nonaqueous electrolyte secondary battery. The constituent elements of the nonaqueous electrolyte secondary battery other than the separator are not limited to the constituent elements described below.

The nonaqueous electrolyte secondary battery of the present invention may use, for example, a nonaqueous electrolyte solution prepared by dissolving a lithium salt in an organic solvent. Examples of the lithium salt include LiClO$_4$, LiPF$_6$, LiAsF$_6$, LiSbF$_6$, LiBF$_4$, LiCF$_3$SO$_3$, LiN(CF$_3$SO$_2$)$_2$, LiC(CF$_3$SO$_2$)$_3$, Li$_2$B$_{10}$Cl$_{10}$, lower aliphatic carboxylic acid lithium salt, and LiAlCl$_4$. The present embodiment may use only one kind of the a hove lithium salts or two or more Ands of the above lithium salts in combination.

The present embodiment preferably uses, among the above lithium salts, at least one fluorine-containing lithium salt selected from the group consisting of LiPF$_6$, LiAsF$_6$, LiSbF$_6$, LiBF$_4$, LiCF$_3$SO$_3$, LiN(CF$_3$SO$_2$)$_2$, and LiC(CF$_3$SO$_2$)$_3$.

Specific examples of the organic solvent in the nonaqueous electrolyte solution include carbonates such as ethylene carbonate, propylene carbonate, dimethyl carbonate, diethyl carbonate, ethyl methyl carbonate, 4-trifluoromethyl-1,3-dioxolane-2-on, and 1,2-di(methoxy carbonyloxy)ethane; ethers such as 1,2-dimethoxyethane, 1,3-dimethoxypropane, pentafluoropropyl methylether, 2,2,3,3-tetrafluoropropyl difluoro methylether, tetrahydrofuran, and 2-methyl tetrahydrofuran; esters such as methyl formate, methyl acetate, and γ-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethyl sulfoxide, and 1,3-propane sultone; and fluorine-containing organic solvents each prepared by introducing a fluorine group into the organic solvents described above. The present embodiment may use only one kind of the above organic solvents or two or more kinds of the above organic solvents in combination.

Among the above organic solvents, carbonates are preferable. A mixed solvent of a cyclic carbonate and an acyclic carbonate or a mixed solvent of a cyclic carbonate and one of ethers is more preferable.

The mixed solvent of a cyclic carbonate and an acyclic carbonate is more preferably a mixed solvent of ethylene carbonate, dimethyl carbonate, and ethyl methyl carbonate because such a mixed solvent allows a wider operating temperature range, and is not easily decomposed even in a case where the present embodiment uses, as an anode active materil, a graphite material such as natural graphite or artificial graphite.

The cathode is normally a sheet-shaped cathode including (i) a cathode mix containing a cathode active material, a conductive material, and a binding agent and (ii) a cathode current collector supporting the cathode mix thereon.

The cathode active material is, for example, a material capable of being doped and dedoped with lithium ions. Specific examples of such a material include a lithium complex oxide containing at least one transition metal such as V, Mn, Fe, Co, or Ni.

Among such lithium complex oxides, (i) a lithium complex oxide having an α-NaFeO$_2$ structure such as lithium nickelate and lithium cobaltate and (ii) a lithium complex oxide having a spinel structure such as lithium manganese spinel are preferable because such lithium complex oxides have a high average discharge potential. The lithium complex oxide may further contain any of various metallic elements, and is more preferably complex lithium nickelate.

Further, the complex lithium nickelate particularly preferably contains at least one metallic element selected from the group consisting of Ti, Zr, Ce, Y, V, Cr, Mn, Fe, Co, Cu, Ag, Mg, Al, Ga, In, and Sn at a proportion of 0.1 mol % to 20 mol % with respect to the sum of the number of moles of the at least one metallic element and the number of moles of Ni in the lithium nickelate. This is because such a complex lithium nickelate allows an excellent cycle characteristic for use in a high-capacity battery. Among such complex lithium nickelate, an active material which contains Al or Mn and in which a ratio of Ni is 85% or more, and more preferably 90% or more is particularly preferable. This is because such an active material allows an excellent cycle characteristic for use in a high-capacity nonaqueous electrolyte secondary battery including a cathode containing the active material.

Examples of the conductive material include carbonaceous materials such as natural graphite, artificial graphite, cokes, carbon black, pyrolytic carbons, carbon fiber, and a fired product of an organic polymer compound. The present embodiment may use (i) only one kind of the above conductive materials or (ii) two or more kinds of the above conductive materials in combination, for example a mixture of artificial graphite and carbon black.

Examples of the binding agent include: thermoplastic resins such as polyvinylidene fluoride, a copolymer of vinylidene fluoride, polytetrafluoroethylene, a tetrafluoroethylene-hexafluoropropylene copolymer, a tetrafluoroethylene-perfluoroalkyl vinyl ether copolymer, an ethylene-tetrafluoroethylene copolymer, a vinylidene fluoride-hexafluoropropylene-tetrafluoroethylene copolymer, a thermoplastic polyimide, polyethylene, and polypropylene; an acrylic resin; and styrene-butadiene rubber. The binding agent functions also as a thickening agent.

The cathode mix may be prepared by, for example, a method of applying pressure to the cathode active material, the conductive material, and the binding agent on the cathode current collector or a method of using an appropriate organic solvent so that the cathode active material, the conductive material, and the binding agent are in a paste form.

The cathode current collector is, for example, an electric conductor such as Al, Ni, and stainless steel, among which Al is preferable because Al is easily processed into a thin film and is inexpensive.

The sheet-shaped cathode may be produced, that is, the cathode mix may be supported by the cathode current collector, through, for example, a method of applying pressure to the cathode active material, the conductive material, and the binding agent on the cathode current collector to form a cathode mix thereon or a method of (i) using an appropriate organic solvent so that the cathode active material, the conductive material, and the binding agent are in a paste form to provide a cathode mix, (ii) applying the cathode mix to the cathode current collector, (iii) drying the applied cathode mix to prepare a sheet-shaped cathode mix, and (iv) applying pressure to the sheet-shaped cathode mix so that the sheet-shaped cathode mix is firmly fixed to the cathode current collector.

The anode is normally a sheet-shaped anode including (i) an anode mix containing an anode active material and (ii) an anode current collector supporting the anode mix thereon. The sheet-shaped anode preferably contains the conductive material and the binding agent.

The anode active material is, for example, (i) a material capable of being doped and dedoped with lithium ions, (ii) a lithium metal, or (iii) a lithium alloy. Specific examples of the material include carbonaceous materials such as natural graphite, artificial graphite, cokes, carbon black, pyrolytic carbons, carbon fiber, and a fired product of an organic polymer compound; chalcogen compounds such as an oxide and a sulfide that are doped and dedoped with lithium ions at an electric potential lower than that for the cathode; metal such as aluminum (Al), lead (Pb), tin (Sn), bismuth (Bi), or silicon (Si) which is alloyed with alkali metal; an intermetallic compound (AlSb, $Mg_2Si$, $NiSi_2$) of a cubic system in which intermetallic compound alkali metal can be inserted in voids in a lattice; and a lithium nitrogen compound ($Li_3$-$xM_xN$ (M: transition metal)). Among the above anode active materials, a carbonaceous material containing a graphite material such as natural graphite or artificial graphite as a main component is preferable, an anode active material which is a mixture of graphite and silicon and in which mixture a ratio of Si to C is 5% or more is more preferable, and an anode active material in which a ratio of Si to C is 10% or more is further preferable. This is because such a carbonaceous material has high electric potential flatness and low average discharge potential and can thus be combined with a cathode to achieve high energy density.

The anode mix may be prepared by, for example, a method of applying pressure to the anode active material on the anode current collector or a method of using an appropriate organic solvent so that the anode active material is in a paste form.

The anode current collector is, for example, Cu, Ni, or stainless steel, among which Cu is preferable because Cu is not easily alloyed with lithium in the case of a lithium ion secondary battery and is easily processed into a thin film.

The sheet-shaped anode may be produced, that is, the anode mix may be supported by the anode current collector, through, for example, a method of applying pressure to the anode active material on the anode current collector to form an anode mix thereon or a method of (i) using an appropriate organic solvent so that the anode active material is in a paste form to provide an anode mix, (ii) applying the anode mix to the anode current collector, (iii) drying the applied anode mix to prepare a sheet-shaped anode mix, and (iv) applying pressure to the sheet-shaped anode mix so that the sheet-shaped anode mix is firmly fixed to the anode current collector. The above paste preferably includes a conductive aid and the binding agent.

The nonaqueous electrolyte secondary battery of the present invention may be produced by (i) arranging the cathode, the separator or the like, and the anode in this order so as to form a nonaqueous electrolyte secondary battery member, (ii) inserting the nonaqueous electrolyte secondary battery member into a container for use as a housing of the nonaqueous electrolyte secondary battery, (iii) filling the container with a nonaqueous electrolyte solution, and (iv) hermetically sealing the container under reduced pressure. The nonaqueous electrolyte secondary battery may have any shape such as the shape of a thin plate (paper), a disk, a cylinder, or a prism such as a cuboid. The nonaqueous electrolyte secondary battery may be produced through any method, and may be produced through a conventionally publicly known method.

EXAMPLES

Method of Measuring Various Physical Properties

Various physical properties of nonaqueous electrolyte secondary battery separators in accordance with Examples and Comparative Examples below were measured in the following methods.

(1) Porosity

A square piece with an 8 cm side was cut out from the porous film which is used as a nonaqueous electrolyte secondary battery separator. The weight W (g) and thickness E (cm) of the piece cut out were then measured. The porosity of the porous film was calculated, on the basis of (i) the weight (W) and thickness (E) measured above and (ii) the true specific gravity ρ (g/cm$^3$) of the porous film, by the following Formula:

$$\text{Porosity} = (1 - \{(W/\rho)\}/(8 \times 8 \times E)) \times 100.$$

(2) Phase Difference and Birefringent Index

A translucent film was obtained by (i) cutting out a square piece with a 4 cm side from the porous film which is used as a nonaqueous electrolyte secondary battery separator and (ii) dropping 0.5 mL of ethanol on the square piece of the porous film so that the square piece is impregnated with ethanol. In doing so, redundant ethanol which was not absorbed by the square piece was wiped off and removed. Then, a birefringent index at 25° C., with respect to light having a wavelength of 590 nm, of the translucent film thus obtained was measured by use of a phase difference measuring device (KOBRA-WPR) manufactured by Oji Scientific Instruments, and a phase difference was calculated.

(3) Electric Resistance

By use of an LCR meter (product name: chemical impedance meter (model: 3532-80)) manufactured by HIOKI E.E. CORPORATION, a voltage having an amplitude of 10 mV was applied at 25° C. to a nonaqueous electrolyte secondary battery that was assembled as described later, and an alternating current impedance was measured. A resistance value R of a real part of a measured frequency of 10 Hz was assumed to be a resistance value (i.e., an internal resistance value of the nonaqueous electrolyte secondary battery) obtained immediately after the nonaqueous electrolyte secondary battery was assembled.

<Production of Nonaqueous Electrolyte Secondary Battery Separator>

As described below, porous films which are used as nonaqueous secondary battery separators were produced as porous films in accordance with Examples 1 through 4.

Example 1

First, 68% by weight of an ultra high molecular weight polyethylene powder (GUR2024, manufactured by Ticona) and 32% by weight of a polyethylene wax (FNP-0115, manufactured by Nippon Seiro Co., Ltd.) that had a weight-average molecular weight of 1000 were prepared, i.e., 100 parts by weight in total of the ultra high molecular weight polyethylene and the polyethylene wax were prepared. Then, 0.4% by weight of an antioxidant (Irg1010, manufactured by Ciba Specialty Chemicals), 0.1% by weight of an antioxidant (P168, manufactured by Ciba Specialty Chemicals), and 1.3% by weight of sodium stearate were added to the ultra high molecular weight polyethylene and the polyethylene wax, and then calcium carbonate (manufactured by Maruo Calcium Co., Ltd.) having an average particle size of 0.1 µm was further added by 38% by volume with respect to a total volume of these compounds. Then, these compounds were mixed in a state of powder by a Henschel mixer, and were then melted and kneaded by a biaxial kneader, and thus a polyolefin resin composition was obtained. Then, the polyolefin resin composition was rolled by a pair of reduction rolls having a surface temperature of 150° C., and was then gradually cooled while being pulled by a winding roll which rotates at a speed different from that of the pair of reduction rolls. In Example 1, a sheet having a thickness of approximately 62 µm was produced at a roll-draw ratio (a winding roll speed/a reduction roll speed) of 1.4 times. The sheet thus produced was immersed in a hydrochloric acid aqueous solution (4 mol/L of hydrochloric acid, 0.5% by weight of a nonionic surfactant), so that calcium carbonate was removed. Then, the sheet was stretched at a stretch ratio of 6.2 times at 105° C., and thus a porous film of Example 1 was obtained.

Example 2

First, 68.5% by weight of an ultra high molecular weight polyethylene powder (GUR4032, manufactured by Ticona) and 31.5% by weight of a polyethylene wax (FNP-0115; degree of branching: 1/1000C; manufactured by Nippon Seiro Co., Ltd.) that had a weight-average molecular weight of 1000 were prepared, i.e., 100 parts by weight in total of the ultra high molecular weight polyethylene and the polyethylene wax were prepared. Then, 0.4% by weight of an antioxidant (Irg1010, manufactured by Ciba Specialty Chemicals), 0.1% by weight of an antioxidant (P168, manufactured by Ciba Specialty Chemicals), and 1.3% by weight of sodium stearate were added to the ultra high molecular weight polyethylene and the polyethylene wax, and then calcium carbonate (manufactured by Maruo Calcium Co., Ltd.) having an average particle size of 0.1 urn was further added by 36% by volume with respect to a total volume of these compounds. Then, these compounds were mixed in a state of powder by a Henschel mixer, and were then melted and kneaded by a biaxial kneader, and thus a polyolefin resin composition was obtained. Then, the polyolefin resin composition was rolled by a pair of reduction rolls having a surface temperature of 150° C., and was then gradually cooled while being pulled by a winding roll which rotates at a speed different from that of the pair of reduction rolls. In Example 2, a sheet having a thickness of approximately 62 µm was produced at a roll-draw ratio (a winding roll speed/a reduction roll speed) of 1.4 times. The sheet thus produced was immersed in a hydrochloric acid aqueous solution (4 mol/L of hydrochloric acid, 0.5% by weight of a nonionic surfactant), so that calcium carbonate was removed. Then, the sheet was stretched at a stretch ratio of 7 times at 105° C., and thus a porous film of Example 2 was obtained.

Example 3

First, 80% by weight of an ultra high molecular weight polyethylene powder (GUR4012, manufactured by Ticona) and 20% by weight of a polyethylene wax (FNP-0115; degree of branching: 1/1000C; manufactured by Nippon Seiro Co., Ltd.) that had a weight-average molecular weight of 1000 were prepared, i.e., 100 parts by weight in total of the ultra high molecular weight polyethylene and the polyethylene wax were prepared. Then, 0.4% by weight of an antioxidant (Irg1010, manufactured by Ciba Specialty Chemicals), 0.1% by weight of an antioxidant (P168, manufactured by Ciba Specialty Chemicals), and 1.3% by weight of sodium stearate were added to the ultra high molecular weight polyethylene and the polyethylene wax, and then calcium carbonate (manufactured by Maruo Calcium Co., Ltd.) having an average particle size of 0.1 µm was further added by 37% by volume with respect to a total volume of these compounds. Then, these compounds were mixed in a state of powder by a Henschel mixer, and were then melted and kneaded by a biaxial kneader, and thus a polyolefin resin composition was obtained. Then, the polyolefin resin composition was rolled by a pair of reduction rolls having a surface temperature of 150° C., and was then gradually cooled while being pulled by a winding roll which rotates at a speed different from that of the pair of reduction rolls. In Example 3, a sheet having a thickness of approximately 62 µm was produced at a roll-draw ratio (a winding roll speed/a reduction roll speed) of 1.4 times. The sheet thus produced was immersed in a hydrochloric acid aqueous solution (4 mol/L of hydrochloric acid, 0.5% by weight of a nonionic surfactant), so that calcium carbonate was removed. Then, the sheet was stretched at a stretch ratio of 4 times at 105° C. and thus a porous film of Example 3 was obtained.

Example 4

First, 80% by weight of an ultra high molecular weight polyethylene powder (GUR4012, manufactured by Ticona) and by weight of a polyethylene wax (FNP-0115; degree of branching: 1/1000C; manufactured by Nippon Seiro Co., Ltd.) that had a weight-average molecular weight of 1000 were prepared, i.e., 100 parts by weight in total of the ultra high molecular weight polyethylene and the polyethylene wax were prepared. Then, 0.4% by weight of an antioxidant (Irg1010, manufactured by Ciba Specialty Chemicals), 0.1% by weight of an antioxidant (P168, manufactured by Ciba Specialty Chemicals), and 1.3% by weight of sodium stearate were added to the ultra high molecular weight polyethylene and the polyethylene wax, and then calcium carbonate (manufactured by Maruo Calcium Co., Ltd.) having an average particle size of 0.1 µm was further added by 37% by volume with respect to a total volume of these compounds. Then, these compounds were mixed in a state of powder by a Henschel mixer, and were then melted and kneaded by a biaxial kneader, and thus a polyolefin resin composition was obtained. Then, the polyolefin resin composition was rolled by a pair of reduction rolls having a surface temperature of 150° C., and was then gradually cooled while being pulled by a winding roll which rotates at a speed different from that of the pair of reduction rolls. In Example 4, a sheet having a thickness of approximately 62 µm was produced at a roll-draw ratio (a winding roll speed/a reduction roll speed) of 1.4 times. The sheet thus produced was immersed in a hydrochloric acid aqueous solution (4 mol/L of hydrochloric acid, 0.5% by weight of a nonionic surfactant), so that calcium carbonate was removed. Then, the sheet was stretched at a stretch ratio of 5.8 times at 105° C., and thus a porous film of Example 4 was obtained.

Comparative Example 1

A commercially available polyolefin porous film (polyolefin separator) was used as Comparative Example 1.

Comparative Example 2

Another commercially available polyolefin porous film (polyolefin separator) which differed from that of Comparative Example 1 was used as Comparative Example 2.

Comparative Example 3

Another commercially available polyolefin porous film (polyolefin separator) which differed from those of Comparative Examples 1 and 2 was used as Comparative Example 3.

<Production of Nonaqueous Electrolyte Secondary Battery>

Next, using the nonaqueous secondary battery separators which were made of the respective porous films in accordance with Examples 1 through 4 and Comparative Examples 1 through 3 which were produced as above, nonaqueous secondary batteries were produced as follows.

(Cathode)

A commercially available cathode which was produced by applying $LiNi_{0.5}Mn_{0.3}Co_{0.2}O_2$/conductive material/PVDF (weight ratio 92/5/3) to an aluminum foil was used. The aluminum foil of the cathode was cut so that a portion of the cathode where a cathode active material layer was formed had a size of 40 mm×35 mm and a portion where the cathode active material layer was not formed, with a width of 13 mm, remained around that portion. The cathode active material layer had a thickness of 58 µm and density of 2.50 g/cm$^3$.

(Anode)

A commercially available anode produced by applying graphite/styrene-1,3-butadiene copolymer/carboxymethyl cellulose sodium (weight ratio 98/1/1) to a copper foil was used. The copper foil of the anode was cut so that a portion of the anode where an anode active material layer was formed had a size of 50 mm×40 mm, and a portion where the anode active material layer was not formed, with a width of 13 mm, remained around that portion. The anode active material layer had a thickness of 49 µm and density of 1.40 g/cm$^3$.

(Assembly)

In a laminate pouch, the cathode, the nonaqueous secondary battery separator, and the anode were laminated (provided) in this order so as to obtain a nonaqueous electrolyte secondary battery member. In this case, the cathode and the anode were positioned so that a whole of a main surface of the cathode active material layer of the cathode was included in a range of a main surface (overlapped the main surface) of the anode active material layer of the anode.

Subsequently, the nonaqueous electrolyte secondary battery member was put in a bag made by laminating an aluminum layer and a heat seal layer, and 0.25 mL of a nonaqueous electrolyte solution was poured into the bag. The nonaqueous electrolyte solution was an electrolyte solution at 25° C. obtained by dissolving $LiPF_6$ with a concentration of 1.0 mole per liter in a mixed solvent of ethyl methyl carbonate, diethyl carbonate, and ethylene carbonate in a volume ratio of 50:20:30. The bag was heat-sealed while a pressure inside the bag was reduced, so that a nonaqueous secondary battery was produced.

<Measurement Results of Various Physical Properties>

Table 1 shows measurement results of a porosity, a birefringent index, and a phase difference of each of the porous films of Examples 1 through 4 and Comparative Examples 1 through 3. Table 1 also shows measurement results of resistance values obtained in nonaqueous electrolyte secondary batteries which had been assembled by respectively using the above porous films as nonaqueous electrolyte secondary battery separators.

TABLE 1

|  | Porosity [%] | Birefringent index | Phase difference [nm] | 10 Hz resistance [Ω] |
| --- | --- | --- | --- | --- |
| Example 1 | 37 | 0.0019 | 19 | 0.91 |
| Example 2 | 50 | 0.0028 | 34 | 0.79 |
| Example 3 | 58 | 0.0039 | 78 | 0.82 |
| Example 4 | 47 | 0.0012 | 14 | 0.87 |
| Comparative Example 1 | 53 | 0.0053 | 133 | 0.99 |
| Comparative Example 2 | 42 | 0.0060 | 149 | 1.03 |
| Comparative Example 3 | 42 | 0.0058 | 146 | 1.15 |

Figure 2:
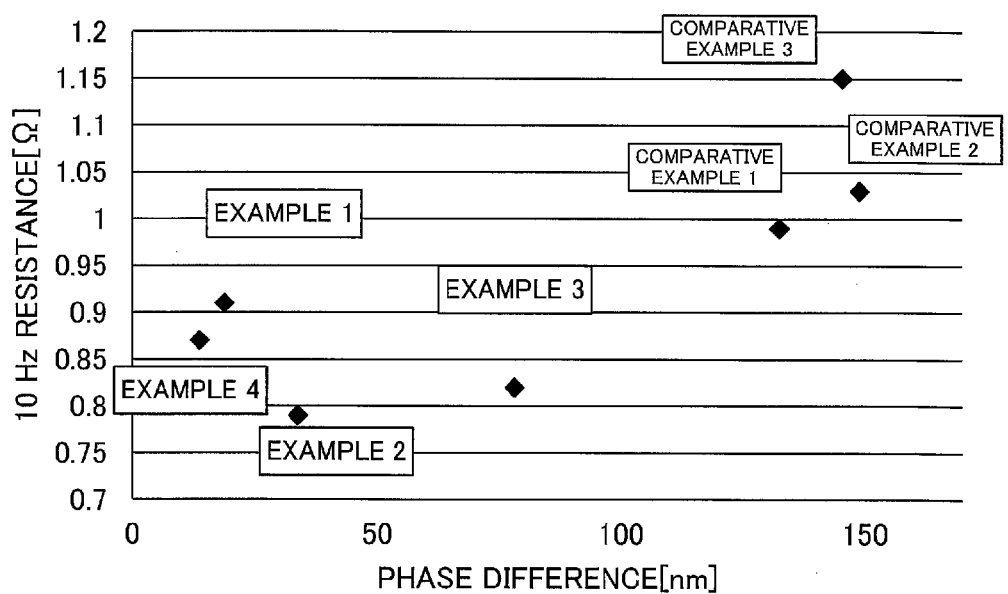
FIG. 2 shows a graph indicating results of measuring a phase difference and a 10 Hz resistance in Examples and Comparative Examples.

FIG. 2 shows a graph in which (i) the measurement results of Examples 1 through 4 and Comparative Examples 1 through 3 are plotted and (ii) a horizontal axis represents the phase differences shown in Table 1 and a vertical axis represents 10 Hz resistances shown in Table 1. As shown in Table 1 and FIG. 2, the nonaqueous electrolyte secondary batteries, in which the respective porous films of Examples 1 through 4 having a porosity of 30% to 60% and a phase difference of 80 nm or less were used as nonaqueous electrolyte secondary battery separators, showed low resistance values which were 0.91Ω or less, after the nonaqueous electrolyte secondary batteries were assembled. Meanwhile, in Comparative Examples 1 through 3, the porous films had a porosity of 30% to 60% and a large phase difference of 100 nm or more, and the nonaqueous electrolyte secondary batteries, in which such porous films were respectively used as nonaqueous electrolyte secondary battery separators, showed high resistance values which were 0.99Ω or more, after the nonaqueous electrolyte secondary batteries were assembled. As such, it was confirmed that the phase difference is correlated with the internal resistance of the nonaqueous electrolyte secondary battery which has been assembled. Further, it was found that, in a case where a porous film having a porosity of 30% to 60% and a phase difference of 80 nm or less is used as a nonaqueous electrolyte secondary battery separator in a nonaqueous electrolyte secondary battery, such a nonaqueous electrolyte secondary battery which has been assembled has an excellent internal resistance.

The invention claimed is:

1. A nonaqueous electrolyte secondary battery separator which is a porous film containing a polyolefin as a main component, said nonaqueous electrolyte secondary battery separator (i) having a phase difference of 80 nm or less with respect to light having a wavelength of 590 nm in a state where said nonaqueous electrolyte secondary battery separator is impregnated with ethanol and (ii) having a porosity of 30% to 60%.

2. A nonaqueous electrolyte secondary battery laminated separator comprising:

a nonaqueous electrolyte secondary battery separator recited in claim 1; and a porous layer.

3. A nonaqueous electrolyte secondary battery member comprising:

a cathode;

a nonaqueous electrolyte secondary battery separator recited in claim 1; and an anode, the cathode, the nonaqueous electrolyte secondary battery separator, and the anode being arranged in this order.

4. A nonaqueous electrolyte secondary battery member comprising:

a cathode;

a nonaqueous electrolyte secondary battery laminated separator recited in claim 2; and an anode, the cathode, the nonaqueous electrolyte secondary battery laminated separator, and the anode being arranged in this order.

5. A nonaqueous electrolyte secondary battery comprising a nonaqueous electrolyte secondary battery separator recited in claim 1.

6. A nonaqueous electrolyte secondary battery comprising a nonaqueous electrolyte secondary battery laminated separator recited in claim 2.

* * * * *